(12) United States Patent
Choi et al.

(10) Patent No.: US 7,561,227 B2
(45) Date of Patent: Jul. 14, 2009

(54) LIQUID CRYSTAL DISPLAY DEVICE AND FABRICATION METHOD THEREOF

(75) Inventors: Su-Seok Choi, Gyeonggi-Do (KR); Sang-Ho Choi, Gyeonggi-Do (KR)

(73) Assignee: LG. Display Co., Ltd., Seoul (KR)

( * ) Notice: Subject to any disclaimer, the term of this patent is extended or adjusted under 35 U.S.C. 154(b) by 480 days.

(21) Appl. No.: 11/479,993

(22) Filed: Jun. 30, 2006

(65) Prior Publication Data

US 2007/0109466 A1    May 17, 2007

(30) Foreign Application Priority Data

Nov. 12, 2005   (KR) .............. 10-2005-0108320

(51) Int. Cl.
*G02F 1/1339* (2006.01)
*G02F 1/1341* (2006.01)

(52) U.S. Cl. ......................... 349/93; 349/157
(58) Field of Classification Search ............ 349/93, 349/157

See application file for complete search history.

(56) References Cited

U.S. PATENT DOCUMENTS

2007/0064176 A1*   3/2007   Kubota et al. ............ 349/93

\* cited by examiner

*Primary Examiner*—Jerry T Rahll
(74) *Attorney, Agent, or Firm*—Brinks Hofer Gilson & Lione

(57) ABSTRACT

A liquid crystal display device comprises a liquid crystal layer formed between first and second substrates, the liquid crystal layer being divided into at least two layers.

20 Claims, 7 Drawing Sheets

LIQUID CRYSTAL DISPLAY DEVICE AND FABRICATION METHOD THEREOF

The present application claims the benefit of Korean Patent Application No. 108320/2005 filed in Korea on Nov. 12, 2005, which is hereby incorporated by reference.

FIELD

The present invention relates to a liquid crystal display device, and more particularly, to a liquid crystal display device and its fabrication method capable of improving the response time of liquid crystal molecules.

BACKGROUND

A liquid crystal display (LCD) device is commonly being used as a flat panel display device realizing high image quality and low power consumption. The LCD device displays an image by controlling an electric field applied to a liquid crystal cell and modulating light incident onto the liquid crystal cell. The LCD device includes a thin film transistor array substrate, a color filter substrate, or a liquid crystal layer interposed therebetween.

The LCD device is divided into a twisted nematic mode (TN mode) and an in-plane switching mode (IPS mode) according to a driving method of liquid crystal molecules.

The TN LCD device includes a thin film transistor array substrate including pixel electrodes, a color filter substrate, and a liquid crystal layer formed between the two substrates. The liquid crystal layer is driven by a vertical electric field between the common electrode and the pixel electrode. Here, the pixel electrode is formed in the thin film transistor array substrate in each unit pixel, and the common electrode is formed over the color filter substrate.

The IPS-LCD device includes a thin film transistor array including common electrodes and pixel electrodes, a color filter substrate including common electrodes, and a liquid crystal layer formed between the two substrates. The liquid crystal layer is driven by a parallel electric field parallel to the surface of the substrate between the common electrode and the pixel electrode. Here, the common electrode and the pixel electrode are alternately formed in each unit pixel at a certain interval therebetween.

In the IPS-LCD device constructed in such a manner, liquid crystal molecules within a liquid crystal layer are always switched on the same plane, so that the grey level is low in both vertical and horizontal viewing angles. For this reason, such an IPS-LCD device may improve viewing angle better than the TN-LCD device.

The switching time of the liquid crystal molecules (i.e., the time it takes for liquid crystal molecules to react to an electric field and the time it takes for liquid crystal molecules to return to an initial alignment state when the electric field is cut off) may be made to be short by reducing an interval (i.e., liquid crystal cell gap) between the thin film transistor array substrate and the color filter substrate or increasing a driving voltage.

However, reducing the liquid crystal cell gap is limited.

Also, when the driving voltage is increased, the time it takes for liquid crystal molecules to react to an electric filed may desirably decrease, but the increase in the driving voltage is limited by a driving IC and a power consumption. Also, such an increase in the driving voltage has no effect upon the time it takes for the liquid crystal molecules to return to an initial alignment state after an electric field is cut off.

Accordingly, according to the related art, it is limited to improve the drive time of liquid crystal molecules using the liquid crystal cell and the driving voltage.

SUMMARY

A liquid crystal display device comprises a liquid crystal layer formed between first and second substrates, the liquid crystal layer being divided into at least two layers.

A method of fabricating a liquid crystal display device comprises preparing a first substrate and a second substrate, forming a first alignment layer on the first substrate, forming photosensitive patterns on the first alignment layer, and applying a mixture of liquid crystals and photo curable monomers on the first alignment layer that includes the photosensitive patterns. The method of fabricating a liquid crystal display device further comprises forming a first liquid crystal layer isolated by polymer walls and polymer layer formed by polymerizing the photo curable monomers, forming a second liquid crystal layer on the first liquid crystal layer, and bonding the first and second substrates together.

At another aspect of the present incention, a method of fabricating a liquid crystal display device comprises preparing a first substrate and a second substrate, forming a first alignment layer on the first substrate, forming photosensitive patterns on the first alignment layer, and applying a mixture of liquid crystals and photo curable monomers on the first alignment layer that includes the photosensitive patterns. The method of fabricating a liquid crystal display device further comprises forming a first liquid crystal layer isolated by polymer walls and a polymer layer formed by polymerizing the photo curable monomers, bonding the first and second substrates together, and injecting a second liquid crystal layer between the first and second substrates.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Reference will now be made in detail to the preferred embodiments of the present invention, examples of which are illustrated in the accompanying drawings.

Figure 1:
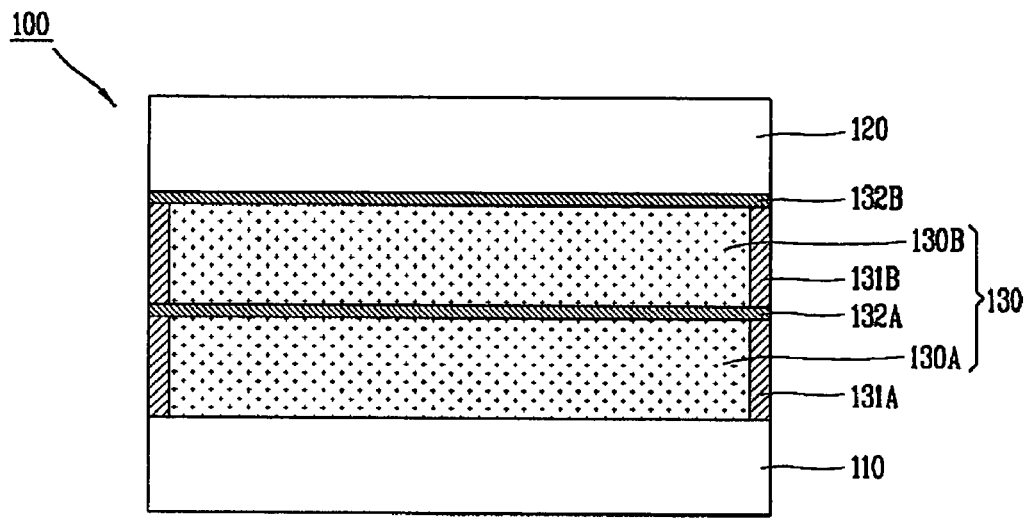
FIG. 1 is a schematic view illustrating a structure of an LCD device according to the present invention.

FIG. 1 is a schematic cross-sectional view of an LCD device according to the present invention, particularly illustrating a section of a unit pixel.

As illustrated, an LCD device 100 according to the present invention includes a first substrate 110, a second substrate 120, and a liquid crystal layer 130 formed between the first and second substrates 110 and 120. The liquid crystal layer 130 is divided into a first liquid crystal layer 130A and a second liquid crystal layer 130B.

Although not shown in the drawing in detail, the first substrate 110 is a thin film transistor array substrate, and includes gate lines and data lines defining a plurality of pixels, and a thin film transistor (TFT) switching each pixel. The second substrate 120 is a color filter substrate and includes a color filter layer.

The LCD device 100 is divided into a TN mode and an IPS mode according to a driving method of liquid crystal molecules, and the present invention may be used for both driving modes.

Figure 2:
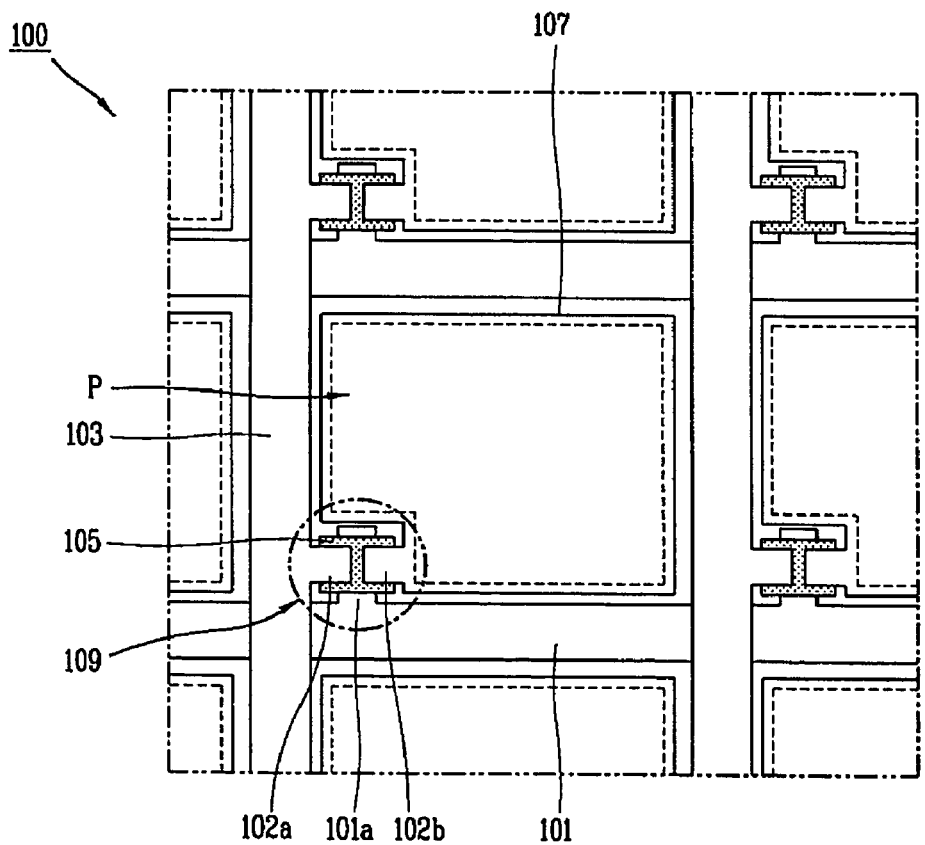
FIG. 2 is a plan view illustrating a first substrate of a TN-LCD device of FIG. 1.
Figure 3:
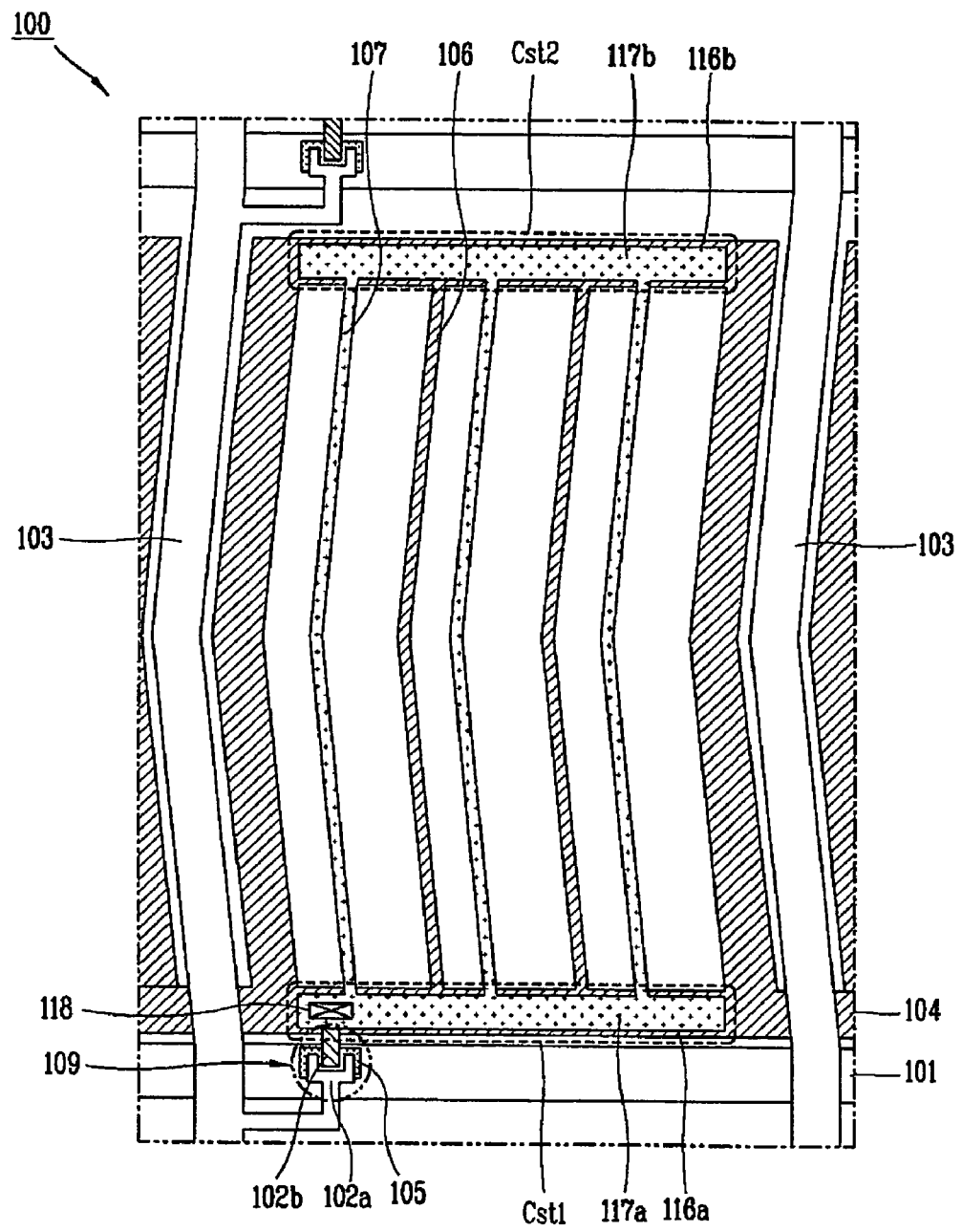
FIG. 3 is a plan view illustrating a first substrate of an IPS-LCD device of FIG. 1.

FIG. 2 is a detailed view of a first substrate of a TN-LCD device 100 according to the present invention, and FIG. 3 is a detailed plan view of a construction of a unit pixel of a first substrate of an IPS-LCD device 100 according to the present invention.

First, as illustrated in FIG. 2, when liquid crystal molecules are driven in the TN mode, the first substrate 100 includes a pixel electrode 107, and a common electrode (not shown) applying a vertical electric field to a liquid crystal layer together with the pixel electrode 106 is formed over the entire second substrate.

In the first substrate 110, gate lines 101 arranged in a first direction and data lines 103 perpendicularly intersecting the gate lines 101 define unit pixels. A switching device 109 is provided at each of intersections of the gate lines 101 and the data lines 103. The switching device 109 includes a gate electrode 101a, a semiconductor layer 105 formed on the gate electrode 101a, and source/drain electrodes 102a and 102b spaced apart from each other at a predetermined interval on the semiconductor layer 105. The pixel electrode 107 is electrically connected to the drain electrode 102b, and is formed over the entire unit pixel.

Although not shown in the drawing, the second substrate 120 includes a black matrix, a color filter layer, and a common electrode formed on an entire surface of the color filter layer. The common electrode drives liquid crystal molecules by applying a vertical electric field into a liquid crystal layer together with the pixel electrode 107.

As illustrated in FIG. 3, when liquid crystal molecules are driven in an IPS mode, the first substrate 110 includes both common and pixel electrodes 106 and 107.

In the first substrate 110, pixel regions are defined by gate lines 101 arranged in a first direction and data lines 103 intersecting the gate lines 101.

A switching device 109 is provided at each of intersections of the gate lines 101 and the data lines 103. The switching device 109 includes a gate electrode 101a formed as a part of the gate line 101, a semiconductor layer 105 formed on the gate electrode 101a, and source/drain electrodes 102a and 120b formed on the semiconductor layer 105 at a predetermined interval therebetween.

At least one pair of common and pixel electrodes 106 and 107 generating an in-plane electric field is formed within a pixel. Here, the pixel electrode 107 is electrically connected to the drain electrode 107b through a drain contact hole 118.

A first common electrode connecting line 116a and a second common electrode connecting line 116b are formed at both ends of the common electrodes 106. Here, the first common electrode connecting line 116a is disposed parallel the gate line 101 and connects one sides of the common electrodes 106, and the second common electrode connecting line 116b connects the other sides of the common electrodes 106. A first pixel electrode connecting line 117a and a second pixel electrode connecting line 117b are formed at both sides of the pixel electrodes 107. Here, the first pixel electrode connecting line 117a electrically connects one sides of the pixel electrodes 107 and overlaps the first common electrode connecting line 116a to form a first storage capacitor (Cst1), and the second pixel electrode connecting line 117b electrically connects the other sides of the pixel electrodes 107 and overlaps the second common electrode connecting line 117b to form a second storage capacitor (Cst2).

Although not shown in the drawing, the second substrate 120 includes a black matrix and a color filter layer. First and second alignment layers (not shown) determining an initial alignment direction of liquid crystal molecules are applied on facing surfaces of the first and second substrates 110 and 120.

In the LCD device having such a structure, the common electrode 106 and the pixel electrode 107 generate an in-plane electric field in a liquid crystal layer, to thereby drive liquid crystal molecules in plane.

The present invention may be used not only for TN and IPS modes but also every LCD device mode having a cell gap such as a vertical alignment mode (VA mode) and an electrically controlled birefringence mode (ECB mode) regardless of driving modes of liquid crystal molecules.

Referring again to FIG. 1, the liquid crystal layer 130 includes first and second liquid crystal layers 130A and 130B. A first cell gap ($d_1$) of the first liquid crystal layer 130A is the same as a second cell gap ($d_2$) of the second liquid crystal layer 130B.

The first liquid crystal layer 130A is isolated by first polymer walls 131A formed at an outer edge and a first polymer layer 132A connecting the first polymer walls 131A. The first polymer wall 131A is formed at an outer edge of a unit pixel, and particularly may be formed along the gate line and the data line. Here, the first polymer walls 131A maintain the first cell gap ($d_1$) of the first liquid crystal layer 130A, and the first polymer layer 132a isolates the first liquid crystal layer 130A from the second liquid crystal layer 130B.

Also, the second liquid crystal layer 130B is isolated by second polymer walls 131B formed at its outer edge and a second polymer layer 132B connecting the second polymer walls 131B. The second polymer walls 131B are formed on the first polymer walls 131A. The second polymer walls 131B maintain the second cell gap ($d_2$) of the second liquid crystal layer 130B, and the second substrate 120, a color filter substrate, is provided on the second polymer layer 132B.

The second polymer wall 131B and the second polymer layer 132B of the second liquid crystal layer 130B may be omitted, and this could be changed depending on a fabrication method. The detailed description thereon will be made later when a fabrication method is described.

In the LCD device according to the present invention having such a structure, a cell gap that the liquid crystal molecules recognize is advantageously reduced by half while the total cell gap (d) of the liquid crystal layer is substantially maintained, so that the switching time of liquid crystal molecules can be improved without changing optical properties (e.g., light transmittance).

In general, the switching time of liquid crystal molecules in a TN or ECB mode (i.e., the time it takes for liquid crystal molecules to react to an electric field and the time it takes for the liquid crystal molecules to return to an initial alignment state) is closely related to a cell gap size the liquid crystal molecules recognize.

The time ($T_{on}$) it takes to drive liquid crystal molecules upon applying an external electric field thereto may be expressed by the following mathematical expression 1, and the time ($T_{off}$) it takes for liquid crystal molecules to return to an initial alignment state when the external electric field is cut off may be expressed by the following expression 2.

$$\tau_{on}] \frac{\eta d^2}{\epsilon_0 \varepsilon (V^2 - V_0^2)} \quad \text{[Expression 1]}$$

$$\tau_{off}] \frac{\eta d^2}{K \Pi^2} \quad \text{[Expression 2]}$$

In the expressions 1 and 2, d represents a cell gap, κ and η represent an elastic modulus and viscosity of liquid crystals, respectively, $\epsilon_0 \varepsilon$ represents a dielectric constant, V and $V_0$ represent a driving voltage and a threshold voltage, respectively.

As shown in the expressions 1 and 2, in the TN mode, the time it takes for liquid crystal molecules to react to an electric field is in proportion to a cell gap of a liquid crystal layer. That is, as the cell gap gets smaller, the reaction time of the liquid crystal molecules gets shorter.

Accordingly, when the cell gap of the liquid crystal layer is reduced from d to (½)d, the reaction time ($T_{on}$, $T_{off}$) of the liquid crystals decreases by ¼. This means that the switching time of the liquid crystal molecules decreases by ¼. In the present invention, because the entire cell gap (d) is maintained and only a cell gap recognized by liquid crystal molecules is reduced, the switching time of the liquid crystal molecules can be improved while the light transmittance properties are maintained.

In the case of the IPS mode, the response time of liquid crystals reacting to an external electric field is expressed by different mathematical expressions from the expressions 1 and 2 because a common electrode and a second electrode are formed on the same substrate. The respond time of liquid crystals in the IPS mode may be expressed by the following mathematical expressions 3 and 4.

$$\tau_{on}] \frac{\eta t^2}{\epsilon_0 \varepsilon (V^2 - V_0^2)} \quad \text{[Expression 3]}$$

$$\tau_{off}] \frac{\eta d^2}{K_{22} \Pi^2} \quad \text{[Expression 4]}$$

In the expressions 3 and 4, d represents an interval between a common electrode and a pixel electrode, $$K_{22}| \text{ and } \eta|$$

represent an elastic modulus and viscosity of liquid crystals, respectively, $$\epsilon_0 \varepsilon|$$

represents a dielectric constant, and $$V| \text{ and } V_0|$$

represent a driving voltage and a threshold voltage (a voltage required for liquid crystal molecules to start driving), respectively.

As shown in the expression 3, the time $$(\tau_{on}|)$$

it takes for the liquid crystals to react to an external electric field in the IPS mode is related to a distance between electrodes, and therefore, a change in a cell gap does not affect the response time of the liquid crystal molecules.

However, as shown in FIG. 4, because the time $$(\tau_{off}|)$$

it takes for the liquid crystal molecules to return to an initial state when an external electric field is cut off is in proportion to the cell gap, a decrease in the cell gap may reduce the restoration time of the liquid crystal molecules to thereby improve the response time.

As described above, in the present invention, a liquid crystal layer is divided and thus a cell gap recognized by liquid crystal molecules is reduced, thereby improving the response time of the liquid crystal molecules reacting to an external electric field. Particularly, in the case of the TN and ECB modes or the like in which a vertical electric field is applied to the liquid crystal layer, both the time it takes for an external electric field to drive liquid crystal molecules and the time it takes for the molecules to return to an initial state may be reduced. Also, in the case of an LCD device in which an in-plane electric field is applied to a liquid crystal layer, even though the time it takes for an external electric field to drive the liquid crystal molecules is not affected, but the time $$(\tau_{off}|)$$

it takes for the liquid crystal molecules to return to an initial state when an external electric field is cut off may be reduced. Consequently, the switching time of the liquid crystal molecules is improved.

As described above, the LCD device according to the present invention is configured to divide a liquid crystal layer and thus reduce a cell gap that liquid crystal molecules recognize. The specific fabrication method thereof will now be described.

FIGS. 4A to 4F are views illustrating a method of fabricating an LCD device according to the present invention, particularly showing a method of forming a liquid crystal panel.

Figure 4A:
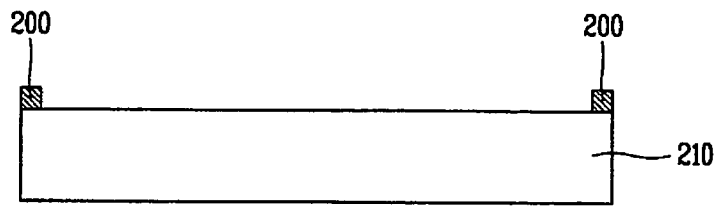
FIGS. 4A to 4F are cross-sectional views illustrating a method of fabricating an LCD device according to the present invention.

As illustrated in FIG. 4A, a first substrate 210 is prepared, and then photosensitive patterns 200 are printed onto the first substrate 210. The photosensitive pattern should be formed of a material easily reacting to light. Here, the first substrate 210 may be a thin film transistor array substrate.

Figure 4B:
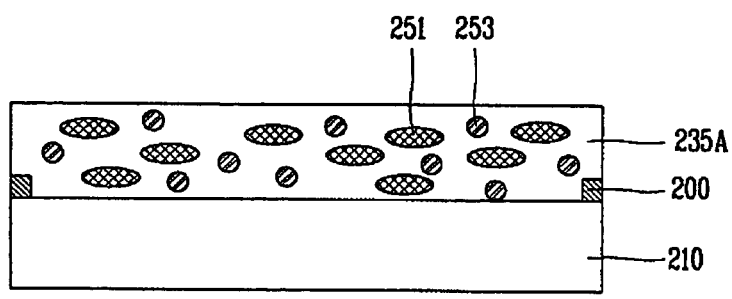

Then, as illustrated in FIG. 4B, a first mixture layer 235 formed of a mixture of liquid crystals 251 and photo curable monomers 253A is applied onto the first substrate 210 including the photosensitive patterns 200. Here, a surface of the first mixture layer is planarized by using a tool, so that the first mixture layer 235A may have a uniform thickness.

Figure 4C:
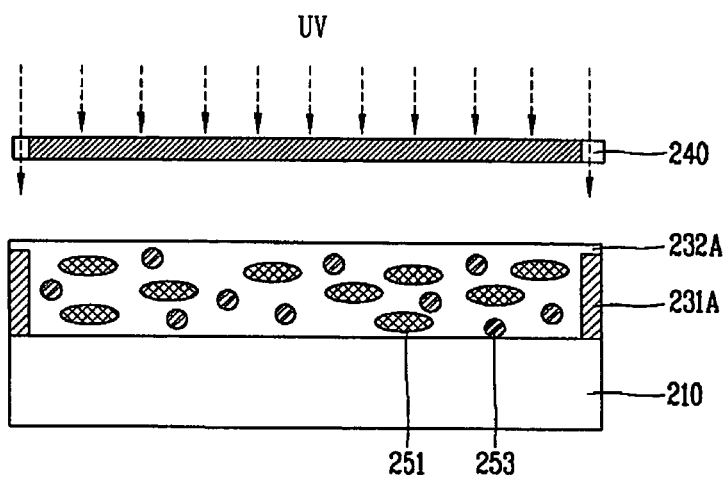

Then, as illustrated in FIG. 4C, light (illustrated as an arrow in the drawing) is emitted to a region in which the photosensitive patterns 200 are printed, through a mask 240 selectively provided with a transmissive portion in a region corresponding to the photosensitive pattern 200. Here, the photo curable monomers 253 form polymers from the photosensitive patterns as starting points, and form first polymer walls 231A on the photosensitive patterns 200.

Figure 4D:
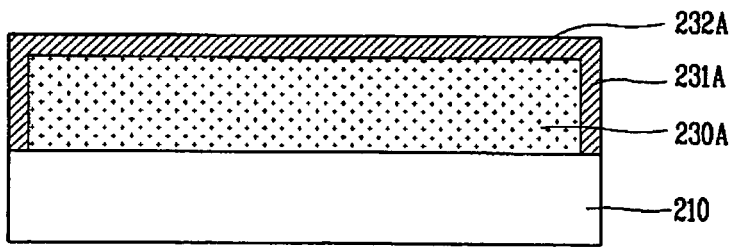

Then, as illustrated in FIG. 4D, the mask is removed, and light is emitted to the entire first mixture layer 235A including the first polymer walls 231a. Here, the photo curable monomers 253 are polymerized by photocuring to thereby form a first polymer layer 232A connecting the first polymer walls 231A. Also, the liquid crystals are phase-separated from the polymers, thereby forming a first liquid crystal layer 230A isolated by the first polymer walls 231A and the first polymer layer 232A.

Figure 5A:
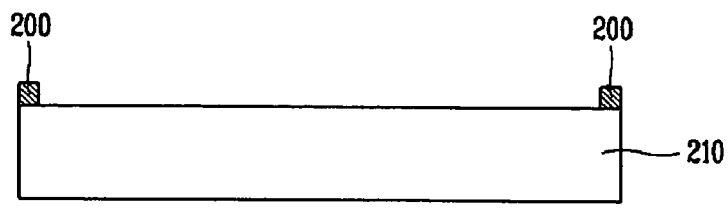
FIGS. 5A to 5D are cross-sectional views illustrating a method of fabricating an LCD device according to another embodiment of the present invention.
Figure 5B:
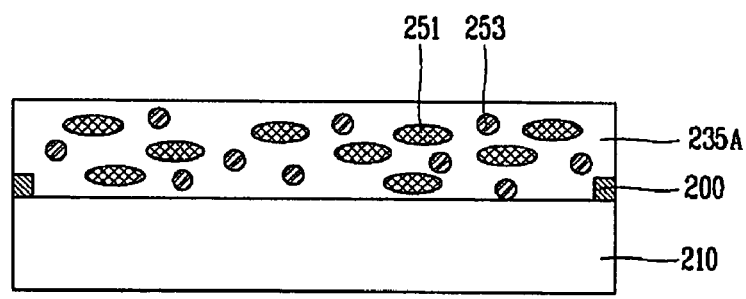
Figure 5C:
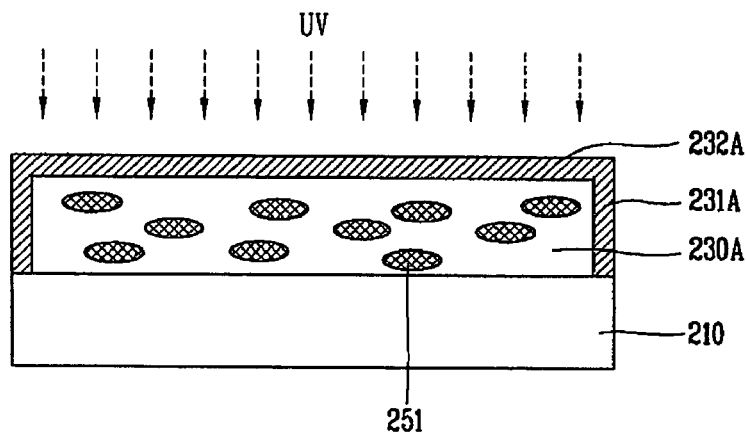
Figure 5D:
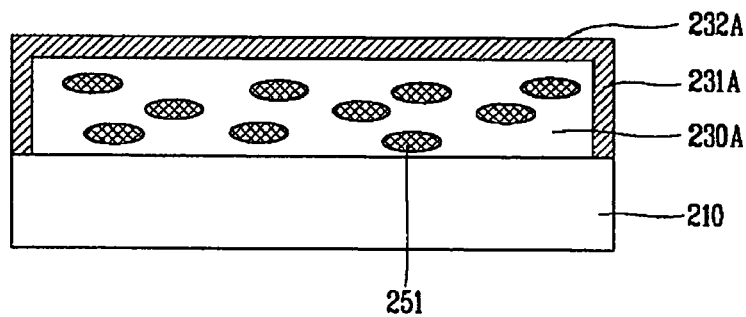

As illustrated in FIGS. 5A to 5C, after the mixture layer 235A is applied, light may be directly emitted to an entire surface of the mixture layer 235A without using a mask. Also, in this case, photo curable monomers are polymerized by the emitted light, first polymer walls 231A are formed along the photosensitive patterns 200, and a first polymer layer 232A connecting the first polymer walls 231A is formed. Thus, the polymers and the liquid crystals are phase-separated from each other, thereby forming a first liquid crystal layer 230A. However, even though a process may be simplified when the mask is not used, in this case, the first polymer walls 231A may have undesirably indistinctive shapes and have curved connection portions with the first polymer layer 232A.

However, both methods described above may be used as the method of forming the first polymer walls 231A and the first polymer layer 232A isolating the first liquid crystal panel according to the present invention.

Figure 4E:
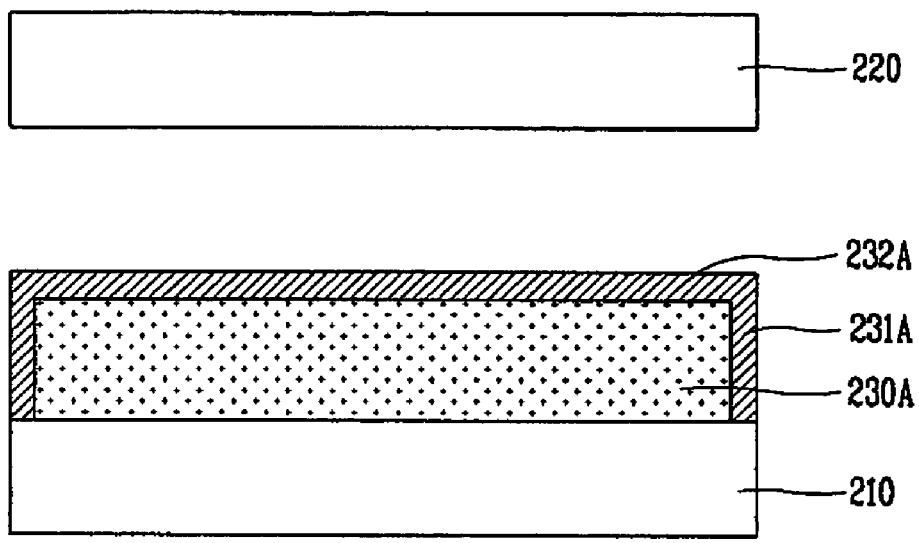

After the first liquid crystal layer is formed through the method described with reference to FIGS. 4A to 4D or FIGS. 5A to 5C, as illustrated in FIG. 4E, a second substrate 220 is prepared and is bonded with the first substrate 210 at a predetermined interval therebetween. Here, the first and second substrates 210 and 220 may be bonded together by a seal pattern (not shown), and special spacers may be formed to maintain the interval (i.e., gap) between the first and second substrates 210 and 220. Also, the second substrate 220 may be a color filter substrate.

Figure 4F:
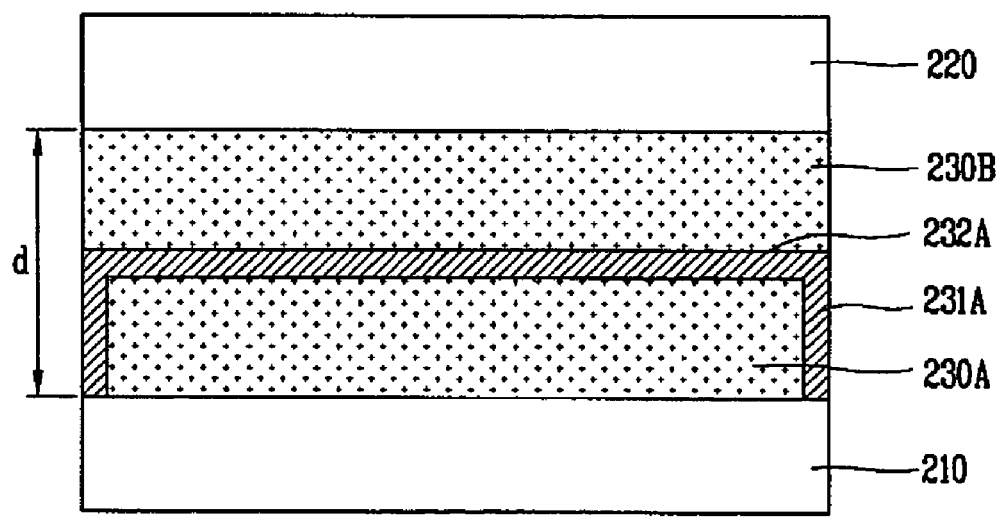

Thereafter, as illustrated in FIG. 4F, a second liquid crystal layer 230B is injected to the gap between the first and second substrates 210 and 220 where the first liquid crystal layer 230A has been formed, thereby forming the second liquid crystal layer 230B. Cell gaps of the first and second liquid crystal layers 230A and 230B are the same, and the sum of the two cell gaps is d.

The second liquid crystal layer 230B may be formed through the method illustrated in FIGS. 4A to 4D or FIGS. 5A to 5C.

Figure 6A:
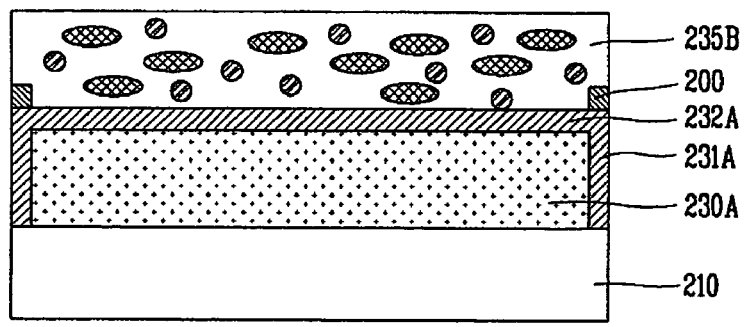
FIGS. 6A to 6D are cross-sectional views illustrating a method of fabricating an LCD device according to still another embodiment of the present invention.
Figure 6B:
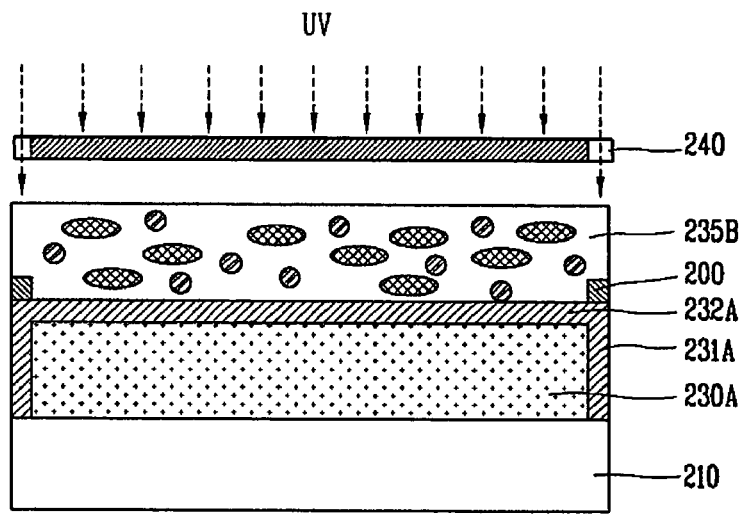
Figure 6C:
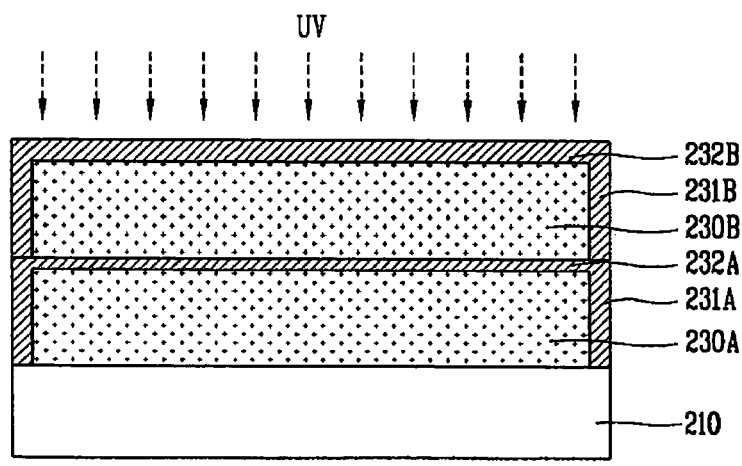
Figure 6D:
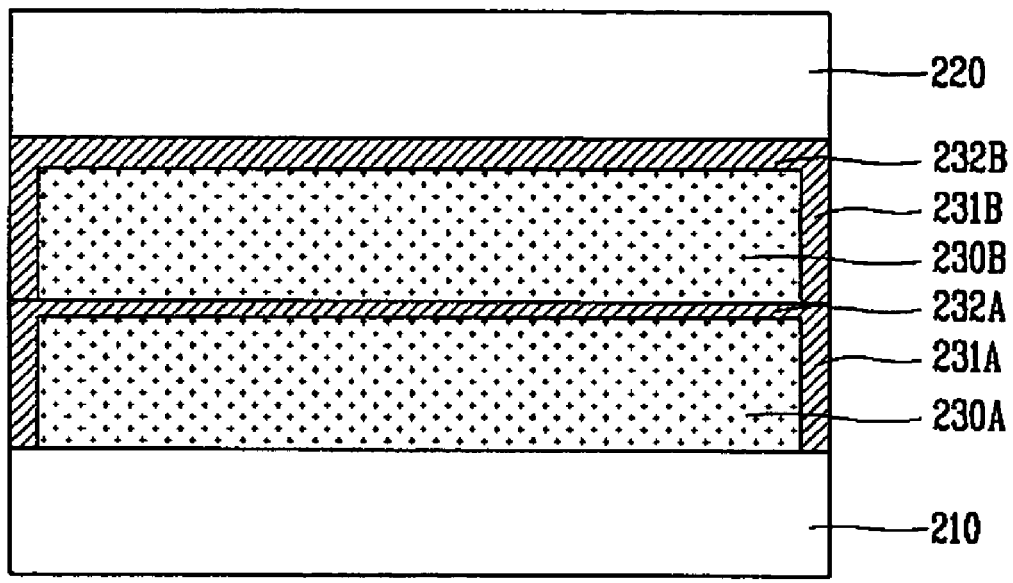

As illustrated in FIGS. 6A to 6D, photosensitive patterns are printed on the first liquid crystal layer 230A formed through the method illustrated in FIGS. 4A to 4D or FIGS. 5A to 5C, and a second mixture 235B of liquid crystals 251 and photo curable monomers 253 are applied thereto. Then, as illustrated in FIG. 6B, light is emitted to the photosensitive patterns 200 using a mask 240, thereby forming second polymer walls 231B along the photosensitive patterns 200. Then, light is emitted to the entire surface of the second mixture 235B to thereby form a second polymer layer 232B, so that a second liquid crystal layer 230B isolated by the second polymer walls 231B and the second polymer layer 232B is formed.

Alternatively, second polymer walls 231B and second polymer layer 232B may be formed in the same manner as the method illustrated in FIGS. 5A to 5C, thereby forming a second liquid crystal isolated thereby.

As described above, as illustrated in FIG. 6D, when the second liquid crystal layer 230B is formed, a second substrate 220 is attached to the second polymer layer, thereby completing an LCD device.

When the second polymer walls 231B are formed in such a manner, spacers for maintaining a cell gap can be advantageously omitted. As mentioned above, the first and second polymer walls 231A and 231B are formed along an outer edge of a unit pixel, e.g., along a gate line and a data line, so that those polymer walls can maintain the cell gap of the liquid crystal layer.

Even though not illustrated in the drawing, the polymer walls may be formed by using a polymer of smetic-A phase.

As described so far, the present invention provides an LCD device and its fabrication method that can improve the response time of liquid crystal molecules by forming a double-layered cell gap. In the present invention, a liquid crystal layer is divided with its entire cell gap maintained, so that a liquid crystal cell gap that liquid crystal molecules substantially recognize is reduced, and thus the response time of the liquid crystal molecules is improved.

The basic concept of the present invention is to reduce a cell gap recognized by liquid crystal molecules by dividing a liquid crystal layer. Therefore, the liquid crystal layer is not necessarily divided into two layers as described above. That is, the present invention includes every LCD device having a liquid crystal layer divided into multi layers regardless of driving methods of liquid crystal molecules.

According to the present invention, by dividing a cell gap of a liquid crystal layer, the response time of liquid crystal molecules is improved, thereby improving the quality of an LCD device.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method of fabricating a liquid crystal display device, the method comprising:
   preparing a first substrate and a second substrate;
   forming a first alignment layer on the first substrate;
   forming photosensitive patterns on the first alignment layer;
   applying a mixture of liquid crystals and photo curable monomers on the first alignment layer that includes the photosensitive patterns;
   forming a first liquid crystal layer isolated by polymer walls and polymer layer formed by polymerizing the photo curable monomers;
   forming a second liquid crystal layer on the first liquid crystal layer; and
   bonding the first and second substrates together.

2. The method of claim 1, wherein the forming of the first liquid crystal layer comprises:
   emitting light to the mixture of liquid crystals and photo curable monomers;
   forming polymer walls by the photo curable monomers along the photosensitive patterns; and
   forming a polymer layer that connects the polymer walls.

3. The method of claim 1, wherein the forming of the liquid crystal layer comprises:
   aligning a mask over the mixture of liquid crystals and photo curable monomers to expose the photosensitive patterns;
   forming polymer walls along the photosensitive patterns by exposing the photosensitive patterns through the mask; and
   forming a polymer layer that connects the polymer walls by emitting light to the mixture of liquid crystals and photo curable monomers to which the polymer walls are formed.

4. The method of claim 1, wherein the forming of the second liquid crystal layer comprises:
   forming second photosensitive patterns on the first liquid crystal layer;
   applying a second mixture of liquid crystals and photo curable monomers on the first liquid crystal layer that includes the second photosensitive patterns;
   emitting light to the second mixture of liquid crystals and photo curable monomers on the first liquid crystal layer;
   forming second polymer walls by the photo curable monomers along the second photosensitive patterns; and
   forming a second polymer layer that connects the second polymer walls.

5. The method of claim 1, wherein the forming of the second liquid crystal layer, comprises:
   forming second photosensitive patterns on the first liquid crystal layer;
   applying a second mixture of liquid crystals and photo curable monomers on the first liquid crystal layer that includes the second photosensitive patterns;
   aligning a mask on the second mixture of liquid crystals and photo curable monomers to expose the second photosensitive patterns;
   forming second polymer walls along the second photosensitive patterns by emitting first light thereto; and
   forming a second polymer layer that connects the second polymer walls by emitting second light to the second mixture of liquid crystals and photo curable monomers to which the second polymer walls are formed.

6. The method of claim 1, wherein the first and second liquid crystal layers have a same cell gap.

7. The method of claim 1, further comprising:
   forming a plurality of gate lines arranged in a first direction on the first substrate;
   forming a plurality of data lines that perpendicularly intersect the gate lines to define a plurality of pixels;
   forming a switching device at each of intersections of the gate lines and the data lines; and
   forming a pixel electrode in each of the plurality of pixels.

8. The method of claim 7, further comprising:
   forming a black matrix on the second substrate;
   forming a color filter layer on the black matrix; and
   forming a common electrode over a surface of the color filter layer.

9. The method of claim 1, further comprising:
   forming a plurality of gate lines arranged in a first direction on the first substrate;
   forming a plurality of data lines that perpendicularly intersect the gate lines to define a plurality of pixels;
   forming a switching device at each of intersections of the gate lines and the data lines; and
   forming a common electrode and a pixel electrode that generate an in-plane electric field within each of the plurality of pixels.

10. The method of claim 9, further comprising:
    forming a black matrix on the second substrate; and
    forming a color filter layer on the black matrix.

11. The method of claim 1, further comprising forming a second alignment layer on a surface of the second substrate that faces the first substrate.

12. A method of fabricating a liquid crystal display device, the method comprising:
    preparing first and second substrates;
    forming a first alignment layer on the first substrate;
    forming photosensitive patterns on the first alignment layer;
    applying a mixture of liquid crystals and photo curable monomers on the first alignment layer that includes the photosensitive patterns;
    forming a first liquid crystal layer isolated by polymer walls and a polymer layer formed by polymerizing the photo curable monomers;
    bonding the first and second substrates together; and
    injecting a second liquid crystal layer between the first and second substrates.

13. The method of claim 12, wherein the forming of the first liquid crystal layer comprises:
    emitting light to the mixture of liquid crystals and photo curable monomers;
    forming polymer walls by the photo curable monomers along the photosensitive patterns; and
    forming a polymer layer that connects the polymer walls.

14. The method of claim 12, wherein the forming of the liquid crystal layer comprises:
    aligning a mask over the mixture of liquid crystals and photo curable monomers to expose the photosensitive patterns;
    forming polymer walls along the photosensitive patterns by exposing the photosensitive patterns through the mask; and
    forming a polymer layer that connects the polymer walls by emitting light to the mixture of liquid crystals and photo curable monomers to which the polymer walls are formed.

15. The method of claim 12, wherein the first and second liquid crystal layers have a same cell gap.

16. The method of claim 12, further comprising:
    forming a plurality of gate lines arranged in a first direction on the first substrate;
    forming a plurality of data lines that perpendicularly intersect the gate lines to define a plurality of pixels;
    forming a switching device at each of intersections of the gate lines and the data lines; and
    forming a pixel electrode in each of the plurality of pixels.

17. The method of claim 16, further comprising:
    forming a black matrix on the second substrate;
    forming a color filter layer on the black matrix; and
    forming a common electrode over a surface of the color filter layer.

18. The method of claim 12, further comprising:
    forming a plurality of gate lines arranged in a first direction on the first substrate;

forming a plurality of data lines that perpendicularly intersect the gate lines to define a plurality of pixels;

forming a switching device at each of intersections of the gate lines and the data lines; and forming a common electrode and a pixel electrode that generate an in-plane electric field within each of the plurality of pixels.

19. The method of claim 18, further comprising:
    forming a black matrix on the second substrate; and
    forming a color filter layer on the black matrix.

20. The method of claim 12, further comprising forming a second alignment layer on a surface of the second substrate that faces the first substrate.

* * * * *